(12) United States Patent
Pencak

(10) Patent No.: US 11,643,150 B2
(45) Date of Patent: May 9, 2023

(54) VEHICLE CARGO STRUCTURE

(71) Applicant: Nissan North America, Inc., Franklin, TN (US)

(72) Inventor: Jeffrey Pencak, Cass City, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 64 days.

(21) Appl. No.: 17/334,545

(22) Filed: May 28, 2021

(65) Prior Publication Data

US 2022/0379977 A1    Dec. 1, 2022

(51) Int. Cl.
*B62D 33/023*    (2006.01)
*B62D 27/02*    (2006.01)

(52) U.S. Cl.
CPC .......... *B62D 33/023* (2013.01); *B62D 27/02* (2013.01); *B62D 27/023* (2013.01)

(58) Field of Classification Search
CPC ... B62D 33/023; B62D 27/203; B62D 27/023
USPC ................................ 296/182.1, 183.1, 186.1
See application file for complete search history.

(56) References Cited

U.S. PATENT DOCUMENTS

| | | | |
|---|---|---|---|
| 5,938,272 | A | 8/1999 | Jurica et al. |
| 6,742,832 | B1 | 6/2004 | Miskech et al. |
| 7,222,913 | B2 | 5/2007 | Womack et al. |
| 7,722,111 | B2 | 5/2010 | Reich et al. |
| 9,120,510 | B1 | 9/2015 | Gillam et al. |
| 9,126,630 | B1 | 9/2015 | Gallagher et al. |

*Primary Examiner* — Dennis H Pedder
(74) *Attorney, Agent, or Firm* — Global IP Counselors, LLP

(57) ABSTRACT

A vehicle cargo structure includes a reinforcement panel, an upright strut member having an upper end, a front wall structure having an attachment bracket fixed to an outboard upper end of the front wall structure and a bracket. The bracket is fixedly attached to a forward portion of the reinforcement panel and the upper end of the upright strut member. The bracket is further secured to the attachment bracket of the front wall structure via mechanical fasteners.

19 Claims, 10 Drawing Sheets

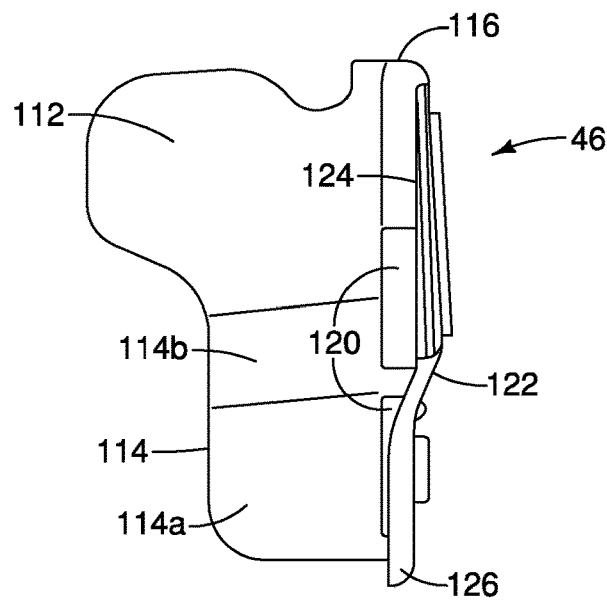
FIG. 14
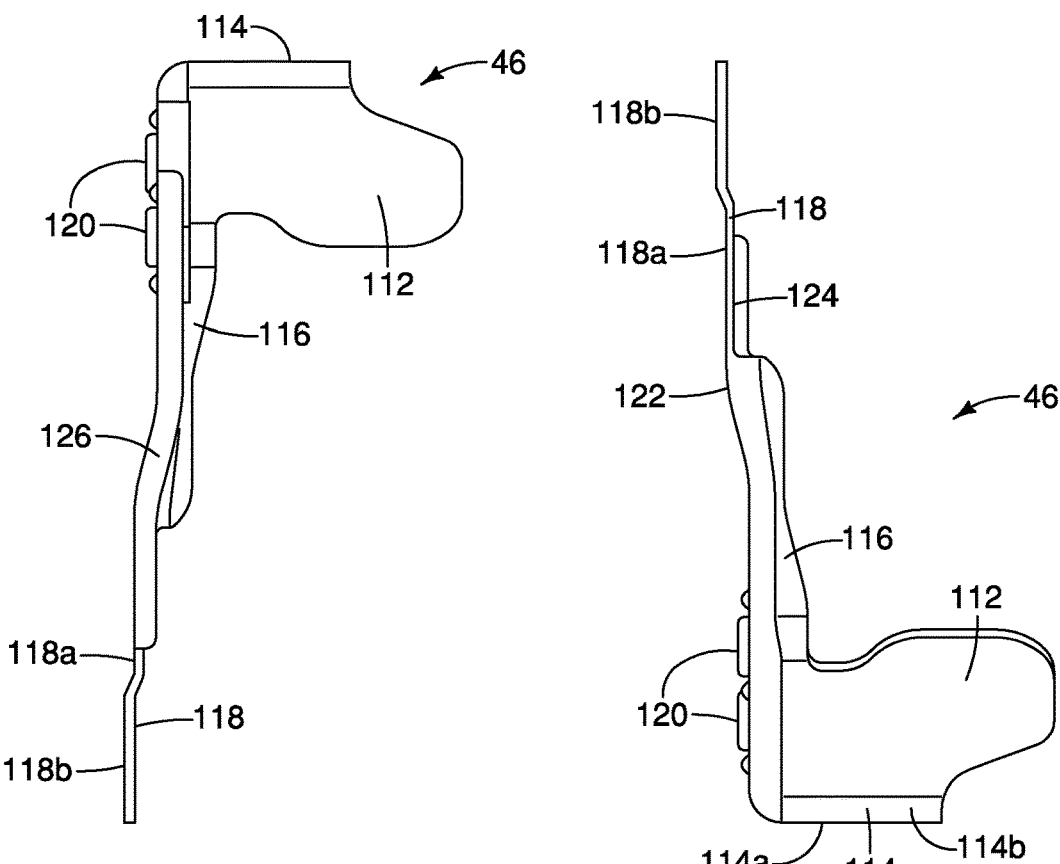
FIG. 15
FIG. 16

VEHICLE CARGO STRUCTURE

BACKGROUND

Technical Field

The present disclosure generally relates to a vehicle cargo structure. More specifically, the present disclosure relates to a cargo structure that includes front corner brackets that provide the cargo structure with flexibility and movement while operating the vehicle.

Background Information

Cargo carrying vehicles, such as pickup trucks endure changes in weight distribution within a cargo area of a cargo structure when differing cargo is placed within the cargo area. Further, with various cargo loads within the cargo area, the cargo structure flexes and moves in response to these changes in loads.

SUMMARY

It has been discovered that vehicle cargo structures provided with flexing capability can provide a longer term of service due to the flexing capability.

One object of the present disclosure is to provide a vehicle cargo structure with structural relationships that allow the cargo structure to flex in response to differing cargo loads in a variety of driving conditions.

In view of the state of the known technology, one aspect of the present disclosure is to provide a vehicle cargo structure with an inboard side wall structure, an upright strut member, a front wall structure and a bracket attached to a forward upper portion of the inboard side wall panel, an upper end of the upright member and an outboard end of the front wall structure.

In another aspect of the present disclosure, a vehicle cargo structure is provided with a reinforcement panel, an upright strut member having an upper end, a front wall structure having an attachment bracket fixed to an outboard upper end of the front wall structure and a bracket fixedly attached to a forward portion of the reinforcement panel and the upper end of the upright strut member, the bracket being further secured to the attachment bracket of the front wall structure via mechanical fasteners.

BRIEF DESCRIPTION OF THE DRAWINGS

Referring now to the attached drawings which form a part of this original disclosure:

FIG. 14 is a rear view of the bracket in accordance with the exemplary embodiment;

FIG. 15 is a bottom view of the bracket in accordance with the exemplary embodiment;

FIG. 16 is a top view of the bracket in accordance with the exemplary embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
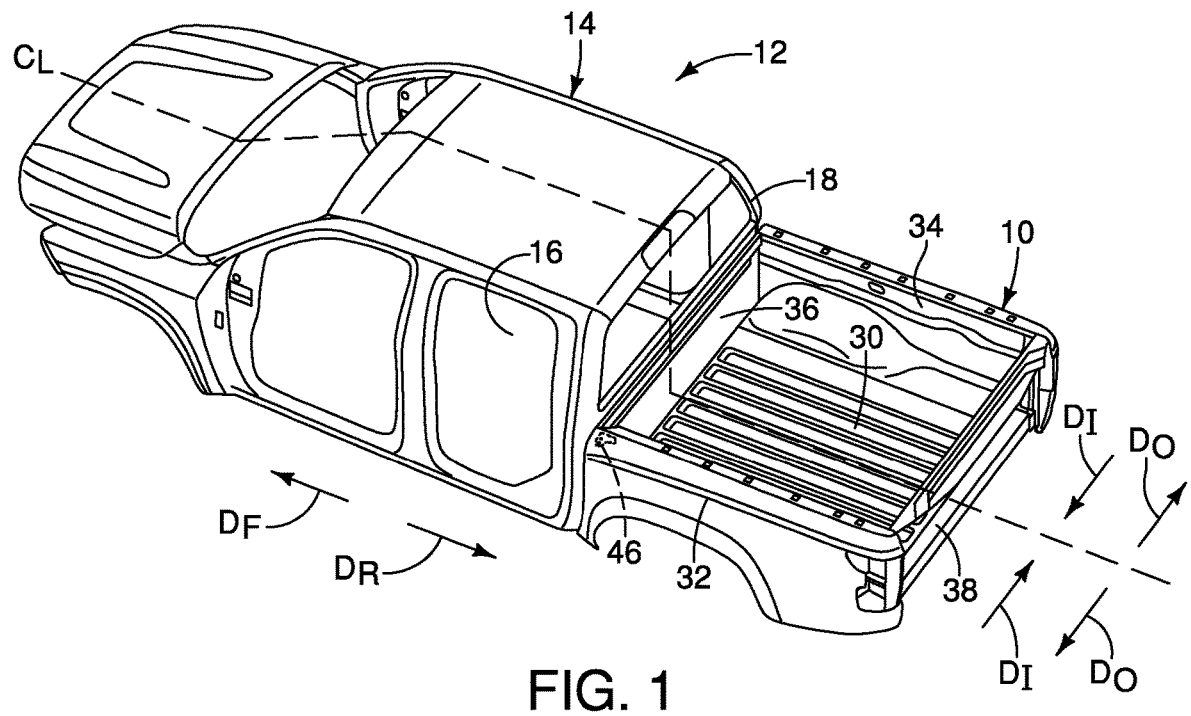
FIG. 1 is a perspective view of a vehicle body structure of a vehicle showing a cab portion and a cargo structure that defines a cargo area in accordance with an exemplary embodiment.

Referring initially to FIG. 1, a vehicle cargo structure 10 of a vehicle 12 is illustrated in accordance with a first embodiment. The vehicle 12 defines a vehicle rearward direction $D_R$, a vehicle forward direction $D_F$, a longitudinal center line $C_L$, inboard directions $D_I$ and outboard directions $D_O$. The inboard directions $D_I$ and outboard directions $D_O$ are defined relative to the longitudinal center line $C_L$.

Figure 2:
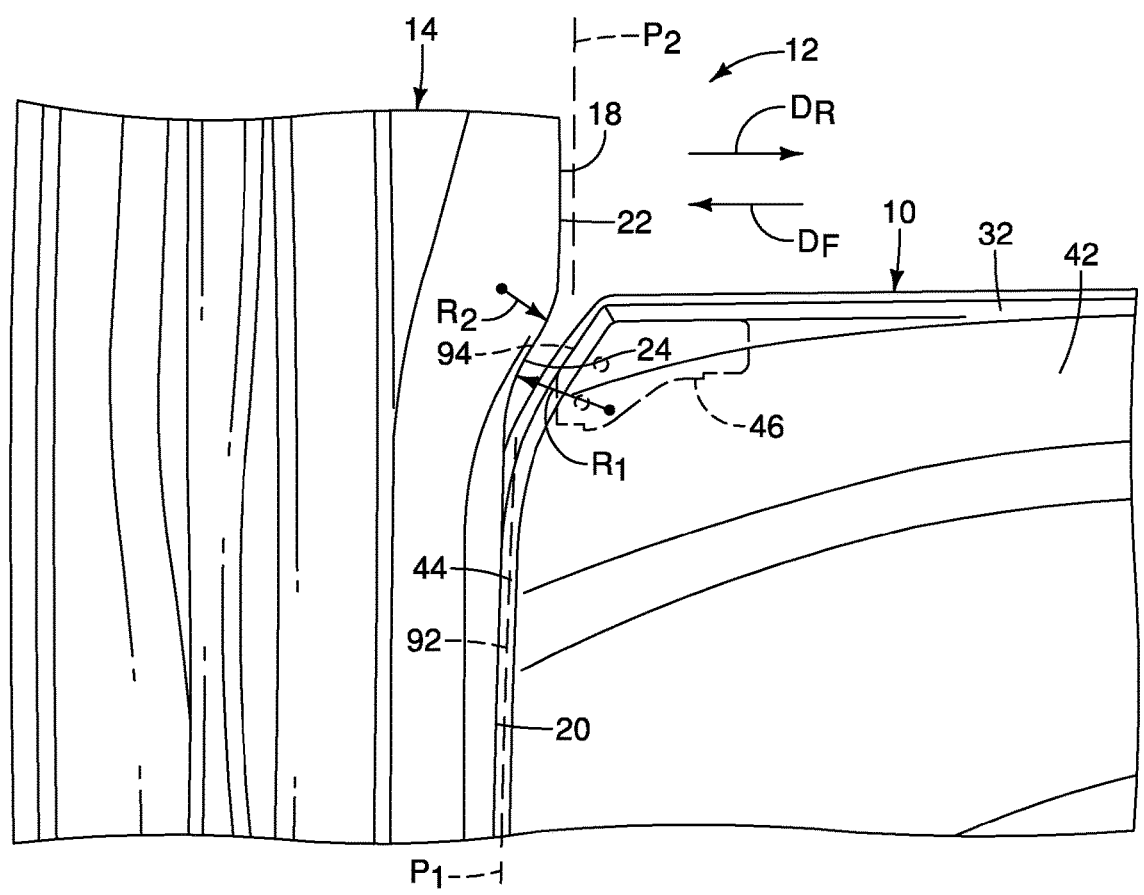
FIG. 2 is a side view showing a gap between the cab portion and the cargo structure of the vehicle in accordance with the exemplary embodiment.
Figure 3:
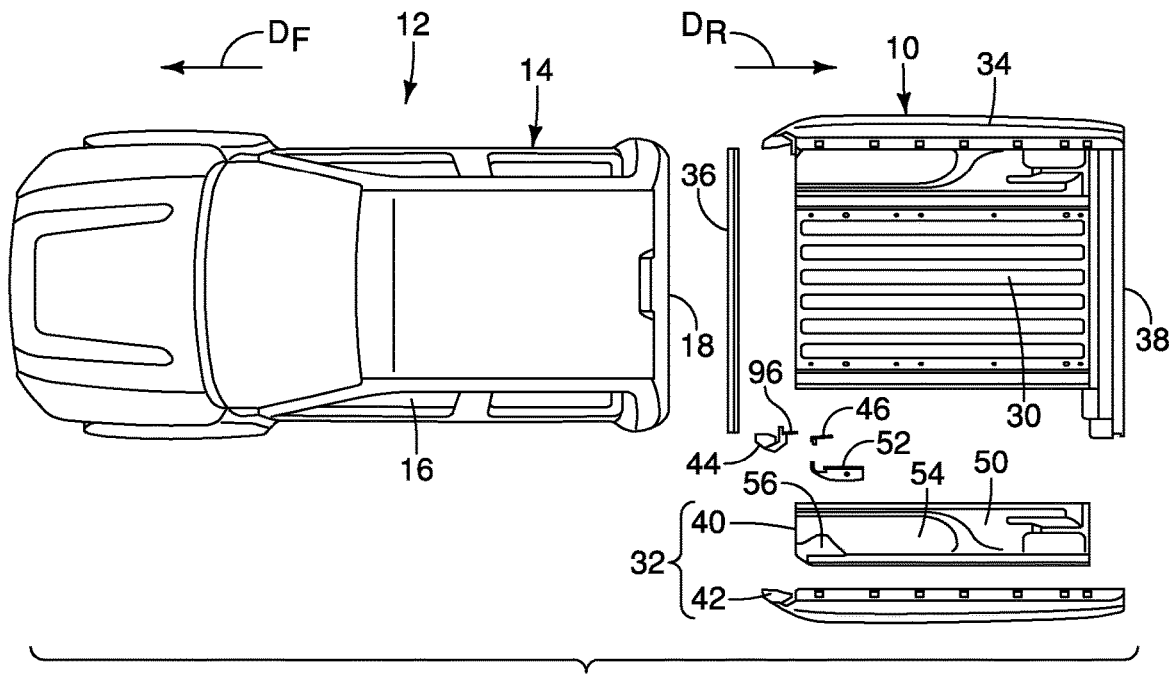
FIG. 3 is an exploded top view of the vehicle showing the cargo structure spaced apart from the cab portion, the cargo structure having a floor, a driver's side wall, a passenger's side wall, a front wall structure, an upright strut member, a bracket and a tail gate structure, the driver's side wall having an inboard side wall structure, an outboard side wall structure and a reinforcement panel in accordance with the exemplary embodiment.

As shown in FIGS. 1, 2 and 3, the vehicle 12 includes a cab portion 14 that defines a passenger compartment 16. The rear wall 18 of the cab portion 14 includes a lower section 20 and an upper section 22 with an offset section 24 located therebetween. The lower section 20 of the cab portion 14 extends along a first plane $P_1$ and the upper section 22 extends along a second plane $P_2$. The first plane $P_1$ and the second plane $P_2$ are offset from one another. More specifically, the lower section 20 is further forward in the vehicle forward direction $D_F$ than the upper section 22. Consequently, the upper section 22 overhangs the lower section 20. The offset section 24 has a curved contour transitioning from the lower section 20 in the vehicle rearward direction $D_R$ toward the upper section 22 but has a more abrupt transition and sharper curve where it meets the lower end of the upper section 22.

The lower section of the rear wall 18 of the cab portion 14 can have a concaved curved contour (not shown). A forward side of a front wall structure 36 (described herein below) can also include a convex curved contour (not shown). A gap is defined between the rear wall of the cab portion 14 and a front surface of the front wall structure 36 such that they do not contact. However, that gap is not visible in FIG. 2.

More specifically, a lower portion of the offset section 24 defines a first radius $R_1$ (with a center point within the vehicle cargo structure 10). An upper portion of the offset section 24 defines a second radius $R_2$ (with a center point within the cab portion 14). The first radius $R_1$ is larger than the second radius $R_2$. In the depicted embodiment, the first radius $R_1$ is more than twice the length of the second radius $R_2$.

A description of the vehicle cargo structure 10 is now provided with specific reference to FIGS. 1-22. The vehicle cargo structure 10 includes a floor structure 30, a driver's side wall 32, a passenger's side wall 34, the front wall structure 36 and a tailgate structure 38. The driver's side wall 32 and the passenger's side wall 34 are identical except that they are symmetrical about the longitudinal center line $C_L$ of the vehicle 12. In other words, the driver's side wall 32 and the passenger's side wall 34 are basically mirror images of one another. Since the driver's side wall 32 and the passenger's side wall 34 of the vehicle cargo structure 10 are basically identical, only the driver's side wall 32 of the vehicle cargo structure 10 will be described below, for the sake of brevity. The description of the driver's side wall 32 applies equally to the passenger's side wall 34. Further, the structural relationships described herein below between the driver's side wall 32 and the front wall structure 36 also apply equally to the structural relationships between the passenger's side wall 34 and the front wall structure 36.

The floor structure 30 is a conventional structure that is attached to lower portions of each of the driver's side wall 32, the passenger's side wall 34 and front wall structure 36 in a conventional manner. Since floor structures are conventional structures, further description is omitted for the sake of brevity. Similarly, since tailgate structures are also conventional structures, further description is also omitted for the sake of brevity.

As shown in FIGS. 3-7, the driver's side wall 32 basically includes inboard side wall structure 40, an outboard side wall member 42, an upright strut member 44 and a bracket 46. As described further below, the upright strut member 44 and the bracket 46 are also part of the front wall structure 36.

The inboard side wall structure 40 includes, among other features, a main panel 50 and a reinforcement panel 52. The main panel 50 has a contoured surface that is shaped to at least partially form a wheel well section 54. The main panel 50 can optionally include a fuel filler section 56. The wheel well section 54 is shaped such that a wheel and corresponding suspension (not shown) of the vehicle beneath the wheel well section 54 is covered from above by the wheel well section 54. The fuel filler section 56 is an optional feature that can be included in either the driver's side wall 32 or the passenger's side wall 34, but preferably not both. Specifically, if a filler tube (not shown) of a fuel tank (not shown) is located outboard of the fuel filler section 56, the fuel filler section 56 of the inboard side wall structure 40 covers and conceals the filler tube. Since fuel filler tubes and fuel tanks are conventional features well known in the art, further description is omitted for the sake of brevity.

Figure 4:
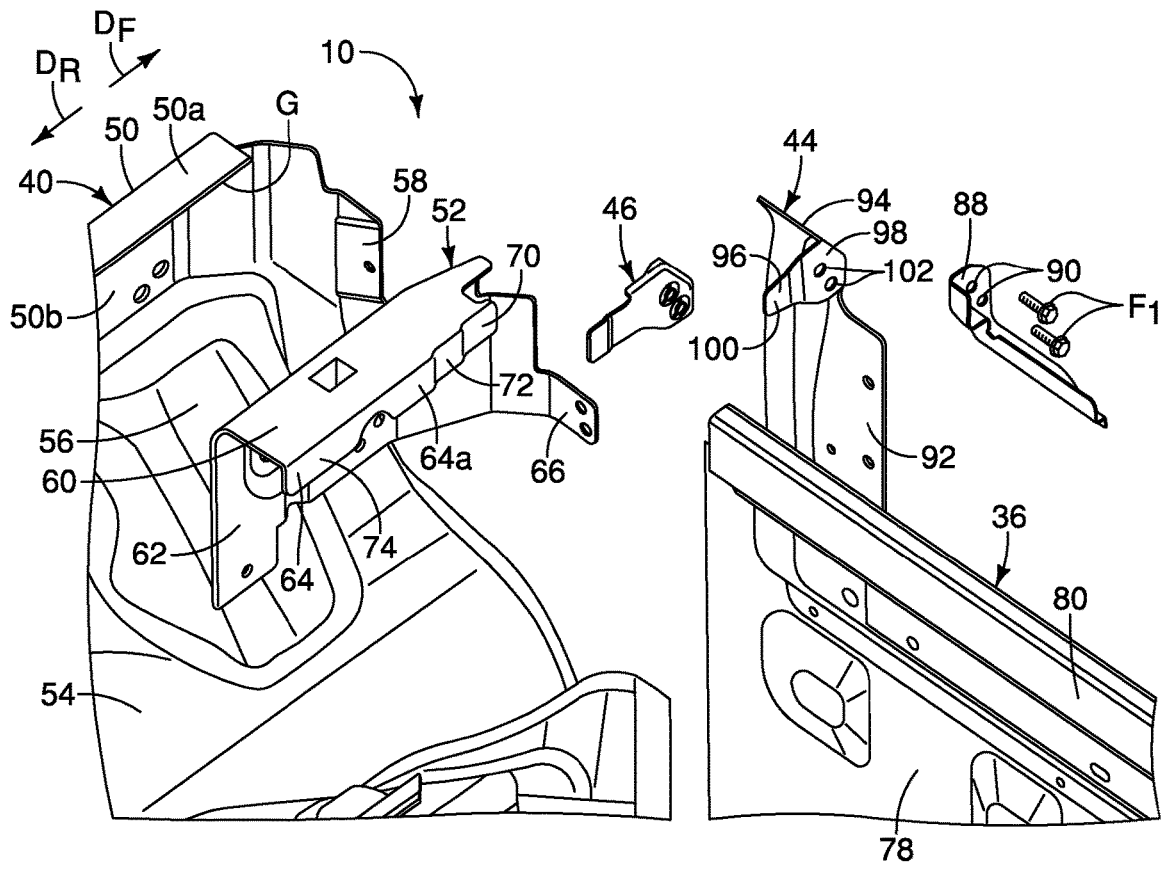
FIG. 4 is an exploded perspective view of a forward portion of the cargo structure showing a forward portion of the inboard side wall structure of the driver's side wall and further showing the reinforcement panel of the inboard side wall structure, the bracket, the upright strut member, an attachment panel (front wall bracket) and a wall panel of the front wall structure in accordance with the exemplary embodiment.
Figure 5:
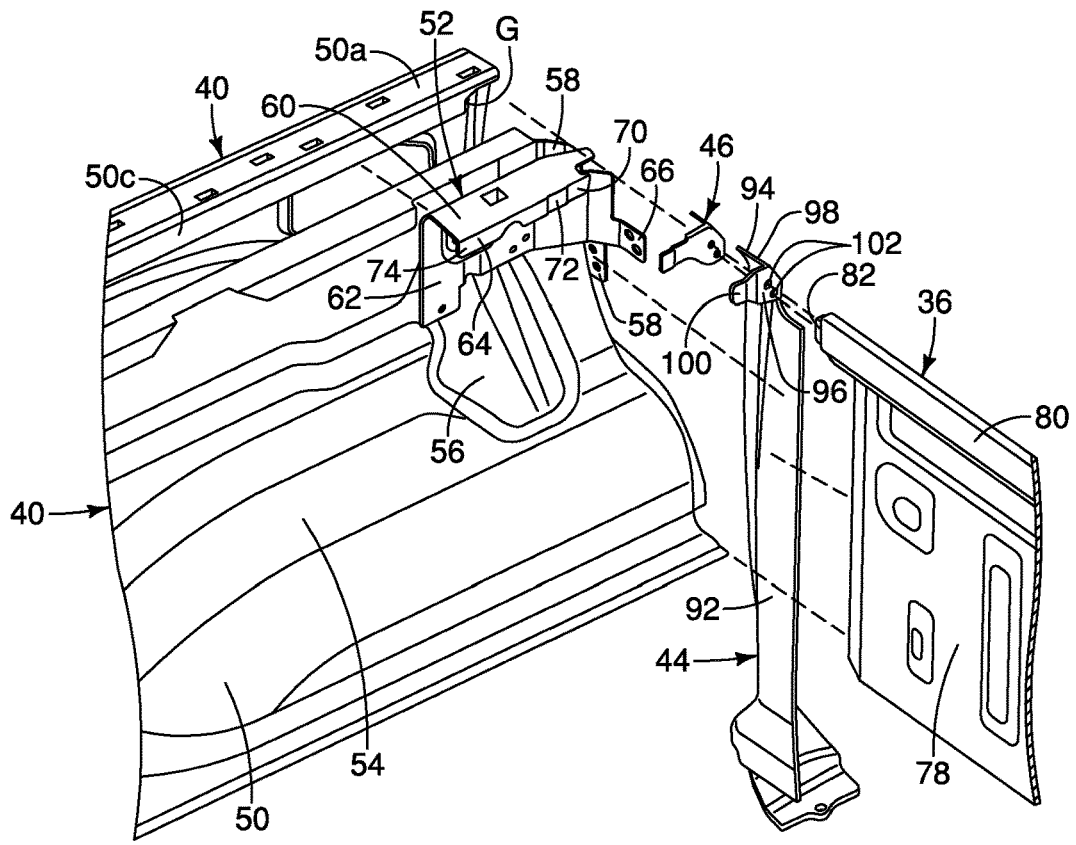
FIG. 5 is another exploded perspective view of the forward portion of the cargo structure partially assembled showing the inboard side wall structure, the reinforcement panel, the bracket, the upright strut member and the front wall structure in accordance with the exemplary embodiment.
Figure 6:
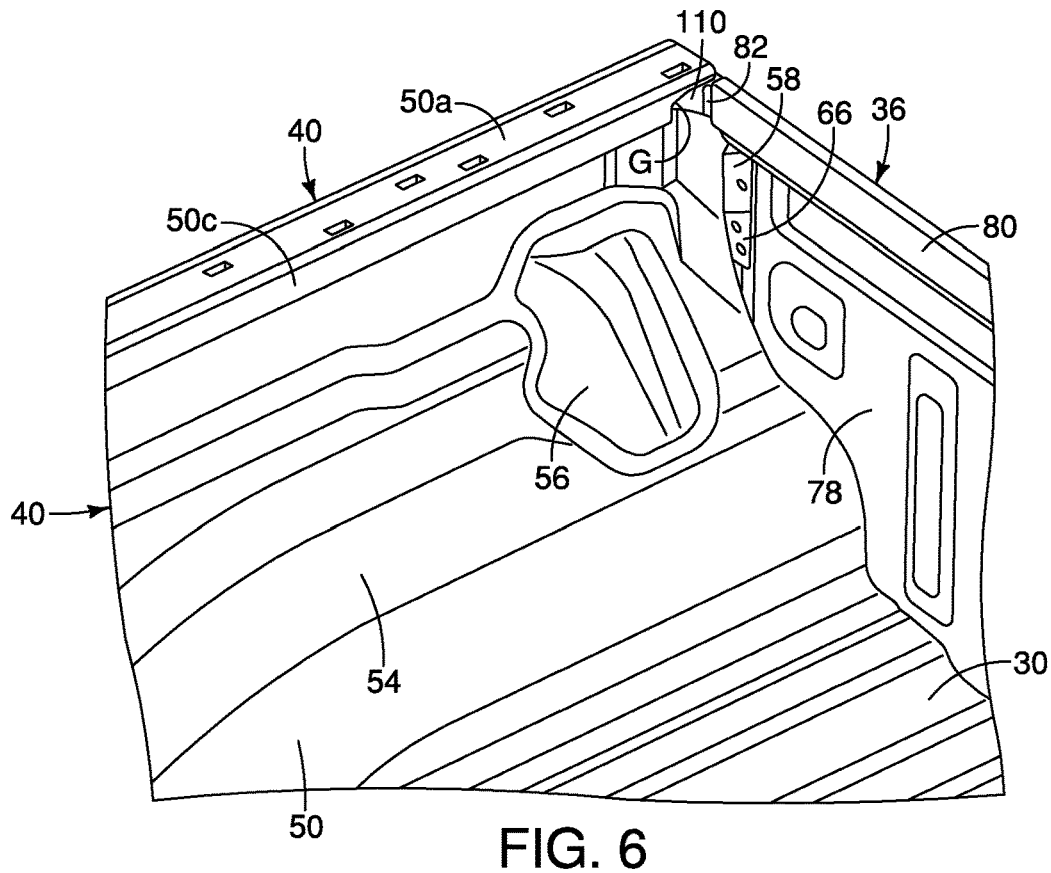
FIG. 6 is a perspective view of the forward portion of the cargo structure showing the forward portion of the inboard side wall structure of the driver's side wall attached to the front wall structure in accordance with the exemplary embodiment.
Figure 7:
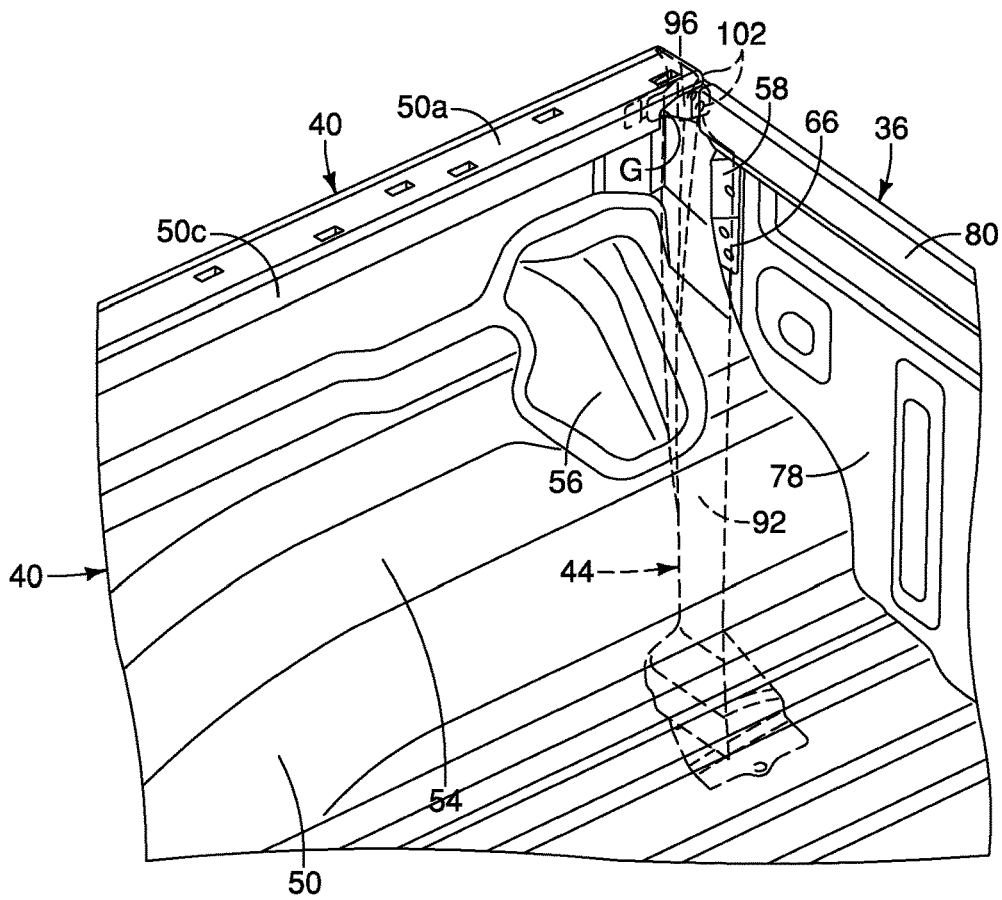
FIG. 7 another perspective view of the forward portion of the cargo structure showing the forward portion of the inboard side wall structure of the driver's side wall attached to the front wall structure and showing the upright strut member in phantom lines in accordance with the exemplary embodiment.
Figure 8:
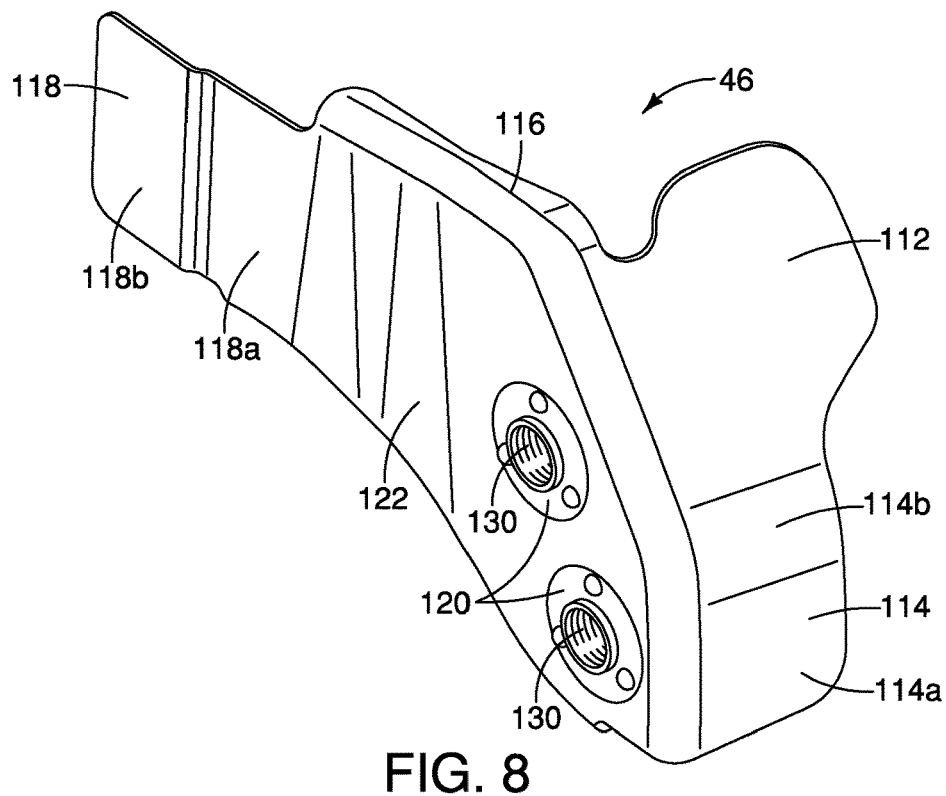
FIG. 8 is a first perspective view of the bracket removed from the vehicle cargo structure showing an inboard facing surface in accordance with the exemplary embodiment.

The main panel 50 also includes an upper portion 50a that extends along the entire length of the upper end of the main panel. As shown in FIG. 4, the main panel also defines an upper outboard area 50b, with the upper portion 50a extending above and along the upper outboard area 50b. The upper portion 50a also includes an inboard flange 50c that extends downward from the upper portion 50a and along a majority of the length of the upper portion 50a. A gap G is defined by the inboard flange 50c at a forward end of the upper portion 50a, as shown in FIGS. 4-6.

As shown in FIGS. 3-7, the main panel 50 of the inboard side wall structure 40 further includes an attachment flange 58 that extends from an upper area of a forward edge of the main panel. The attachment flange 58 is bent in an inboard direction such that the attachment panel 58 is parallel with the front wall structure 36.

The reinforcement panel 52 has an upper section 60, an outboard section 62, an inboard section 64 and a forward flange section 66. The outboard section 62 extends downward from an outboard side of the upper section 60. The inboard section 64 extends downward from an inboard side of the upper section 60. The inboard section 64 that defines a downwardly extending flange having an inboard surface 64a. The inboard surface 64a include a first section 70, a second section 72 and a third section 74. The first section 70 is offset from the second and third sections 72 and 74. Further, the second section 72 is offset from the third section 74. More specifically, the first section 72 is parallel to the second and third sections 72 and 74 but is offset in the outboard direction Do from the second and third sections 72 and 74. Similarly, the second section 72 is offset in the outboard direction Do from the third section 74. The first section 70 is adjacent to and forward of the second section 72. The second section is adjacent to and forward of the third section 74.

Figure 9:
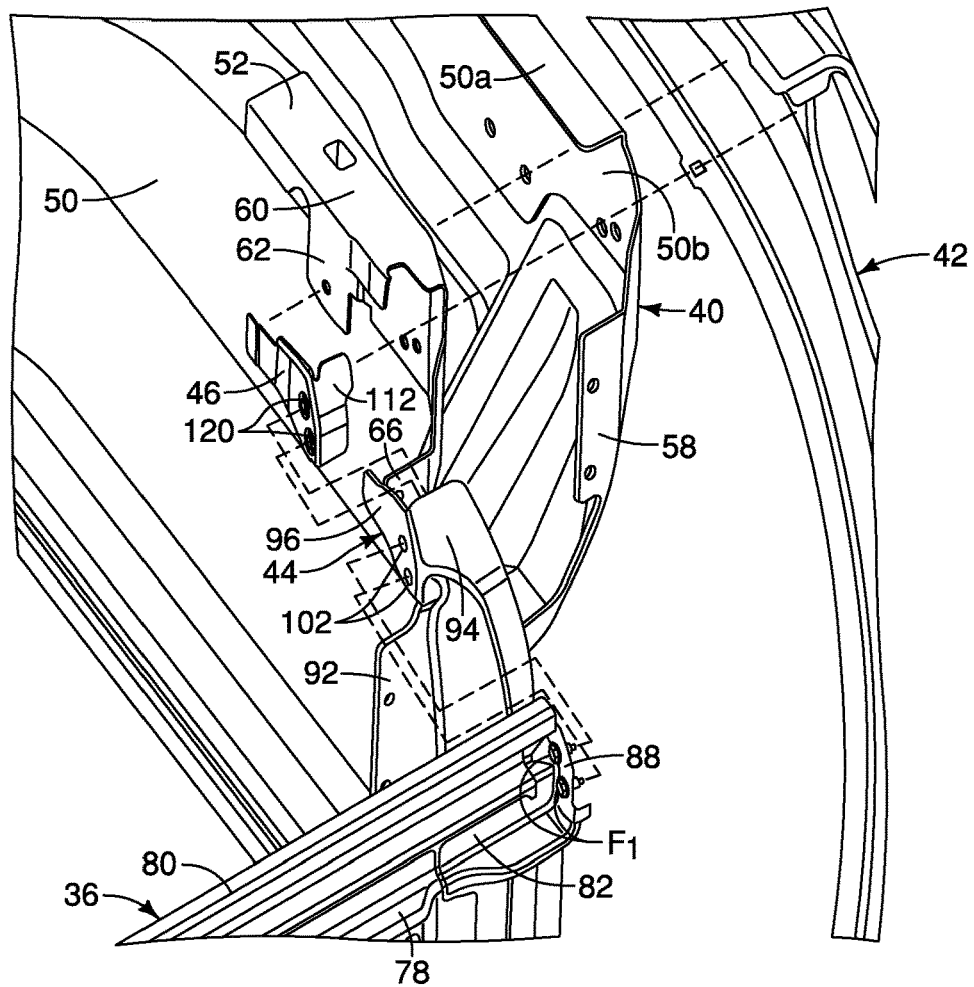
FIG. 9 is another exploded perspective view of the forward portion of the cargo structure from a different angle compared to FIG. 4, showing the forward portion of the inboard side wall structure of the driver's side wall, the reinforcement panel of the inboard side wall structure, the bracket, the upright strut member, the attachment panel (front wall bracket) and the wall panel of the front wall structure in accordance with the exemplary embodiment.

The forward flange 66 extends from a forward end of the outboard section 62 and is bent such that the forward flange 66 is parallel to the front wall structure 36. Except for the forward flange 66, the reinforcement panel 52 has an upside down U-shape, as viewed looking rearward, as shown in FIG. 9. The upper section 60 of reinforcement panel 52 of the inboard side wall structure 40 is welded to or otherwise fixedly attached to an underside of an upper portion 50a of the main panel 50. Also, the outboard section 62 of the reinforcement panel 52 is welded to or otherwise fixedly attached to an upper outboard area 50b of the main panel 50.

A description of the outboard side wall member 42 is provided below following a description of the front wall structure 36, the upright strut member 44 and the bracket 46.

The front wall structure 36 includes a wall panel 78, an upper support rail 80 (a top rail panel) and an attachment panel 82 (a front wall bracket). The wall panel 78 extends across the front of the cargo structure 10 from one of the upright strut member 44 at the front end of the driver's side wall 32 to the upright strut member 44 (not shown) at the front end of the passenger's side wall 34. The upper support rail 80 (also referred to as a top rail panel) is fixedly attached to an upper end of the wall panel 78 via, for example, welding techniques.

The attachment panel 82 (also referred to as a front wall bracket) has an elongated portion 86 and a flange portion 88. The elongated portion 86 extends in a vehicle inboard directions $D_I$ from the upright strut member 44. The elongated portion 86 is fixedly attached to one or both of wall panel 78 and the upper support rail 80 via, for example, any of a variety or combination of various welding techniques.

Figure 20:
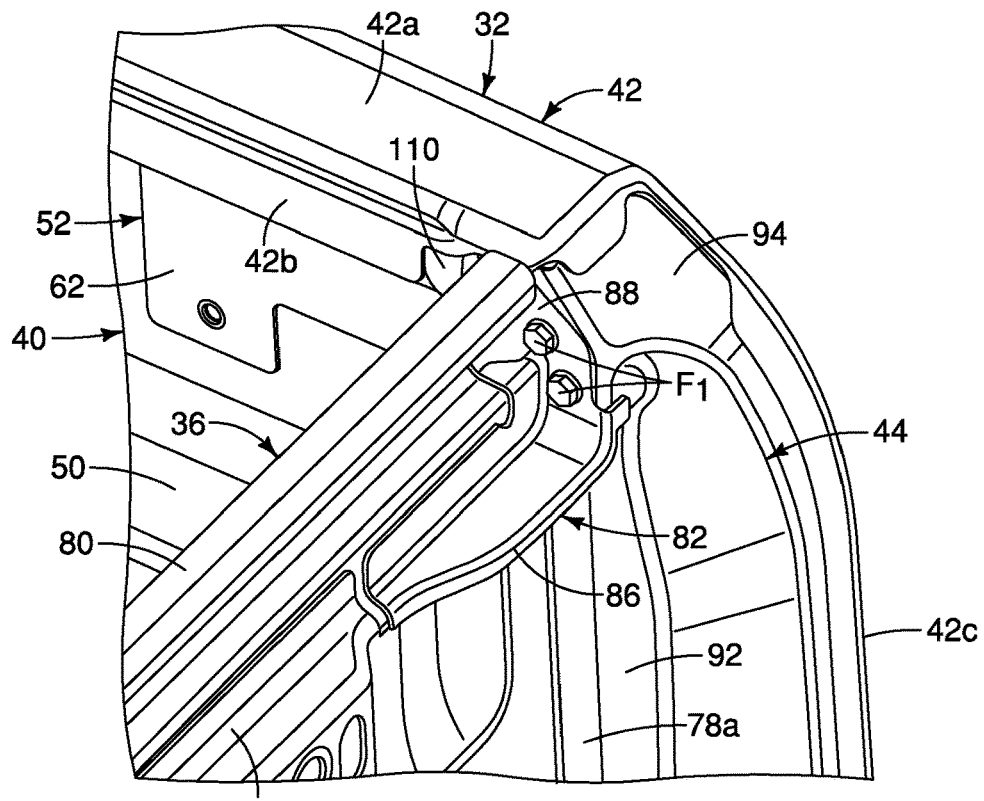
FIG. 20 is another perspective view of the vehicle cargo structure similar to FIG. 17-19 showing an upper support rail and an attachment panel attached to the upper support rail and the wall panel of the front wall structure, and further showing attachment between the attachment panel of the front wall structure, a rearwardly extending flange of the upright strut member and the bracket via mechanical fasteners in accordance with the exemplary embodiment.
Figure 21:
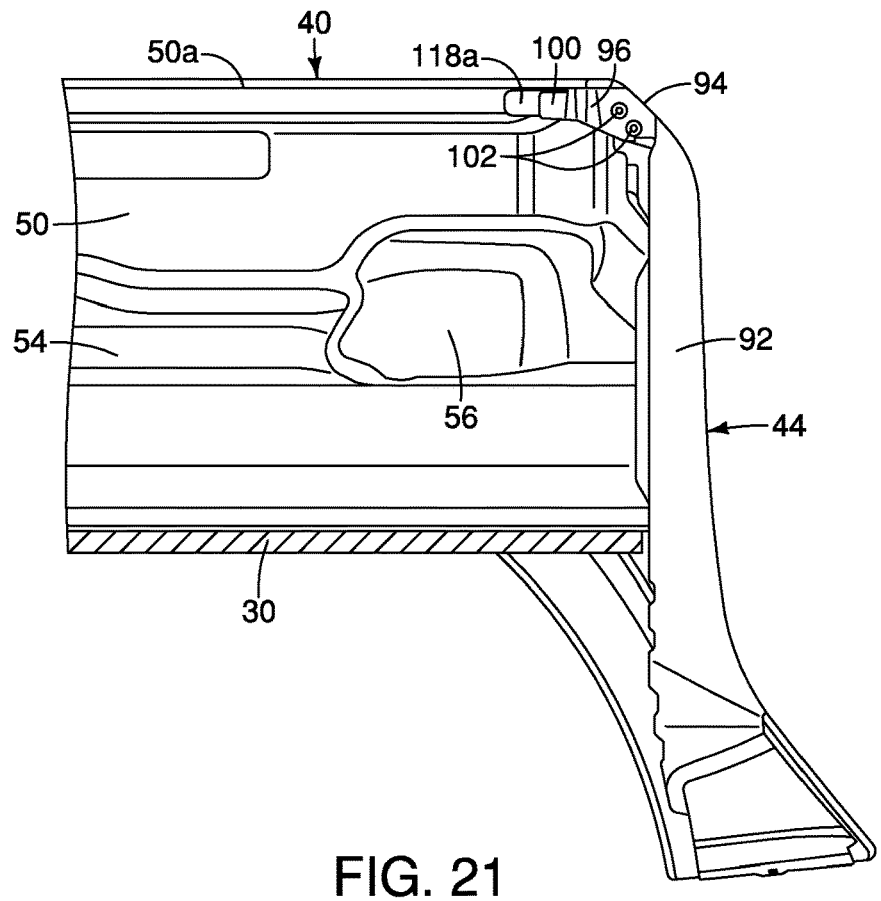
FIG. 21 is a side view of an inboard side of the driver's side wall and the upright strut member with the front wall structure removed in accordance with the exemplary embodiment.
Figure 22:
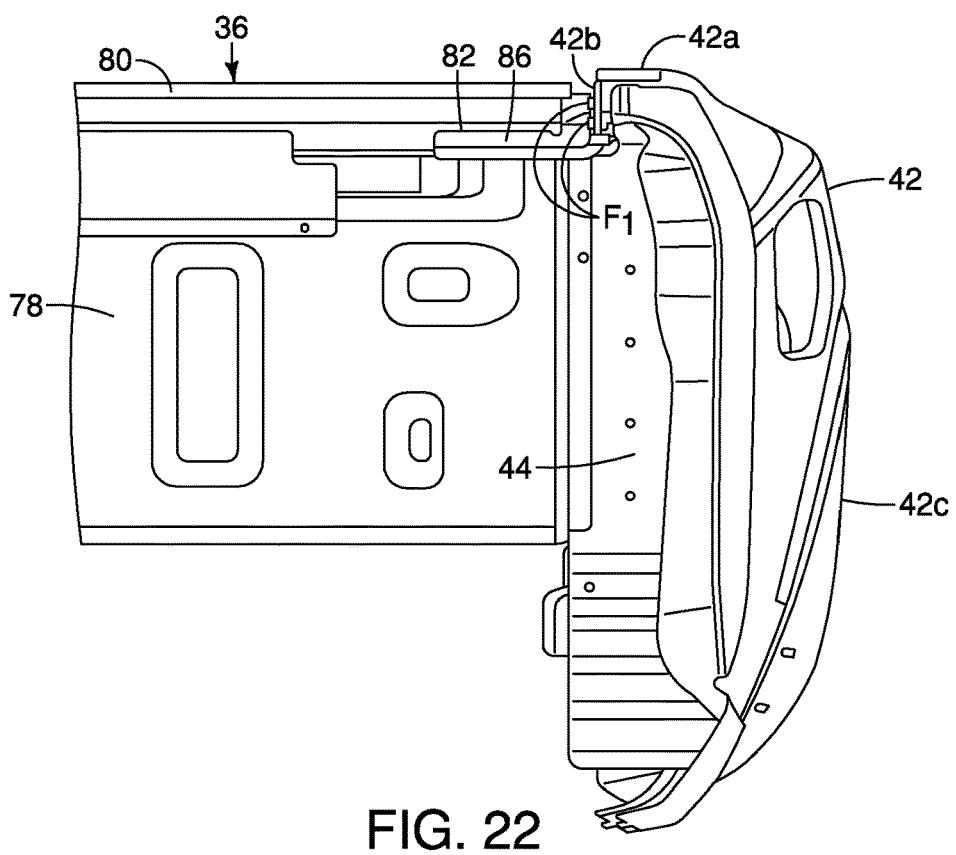
FIG. 22 is a front view of the front wall structure and the driver's side wall showing the fasteners attaching the front wall structure to the driver's side wall and the upright strut member in accordance with the exemplary embodiment.

The flange portion 88 extends in a vehicle rearward direction $D_R$ from an outboard end of the elongated portion 44. The flange portion 88 is also vertically oriented. As shown in FIGS. 4, 9 and 20, the flange portion 88 includes a pair of openings 90 that are described further below.

A description of the upright strut member 44 is now provided with specific reference to FIGS. 1, 3-5, 7, 9 and 18-22.

The upright strut member 44 is a structural element that connects the driver's side wall 32 to the front wall structure 36, as described in greater detail below. The upright strut member 32 includes a main section 92, a curved upper end section 94 and a rearwardly extending flange 96.

The main section 92 is vertically oriented extending from a lower portion (not shown) of the vehicle cargo structure 10 or vehicle frame (not shown) to an upper end of the inboard side wall structure 40 and an upper end of the front wall structure 40.

The curved upper end section 94 defines an upwardly facing surface portion that extends rearward and upward from the main section 92, as shown in FIG. 2. As is also shown in FIG. 2, the curved upper end section 94 is inclined by an angle relative to vertical that complements the curvature of the offset section 24 of the cab portion 14 of the vehicle 12. Further, the curved upper end section 94 is spaced apart from the offset section 24 of the cab portion 14 of the vehicle 12.

The rearwardly extending flange 96 extends in a rearward direction from the curved upper end section 80 and an upper end of the main section 92. The rearwardly extending flange 96 is vertically oriented. The rearwardly extending flange 96 has an attachment section 98 and a bracket attachment section 100. The attachment section 98 includes a pair of openings 102. The bracket attachment section 100 is parallel to and offset from the attachment section 98.

A description of the bracket 38 is now provided with reference to FIGS. 4-5 and 7-20. The bracket 38 is basically a single metallic member, unitarily formed and a monolithic member that includes a main section 110, a first flange portion 112, a second flange portion 114, a third flange portion 116, a fourth flange portion 118 and fastener structures 120. The main section 110 has an inboard facing surface 122 and an outboard facing surface 124. For example, the bracket 38 can be stamped from a blank sheet metal material to form the main section 110, the first flange portion 112, the second flange portion 114, the third flange portion 116 and the fourth flange portion 118. The fastener structures 120 are preferably welded to the bracket 38.

Figure 10:
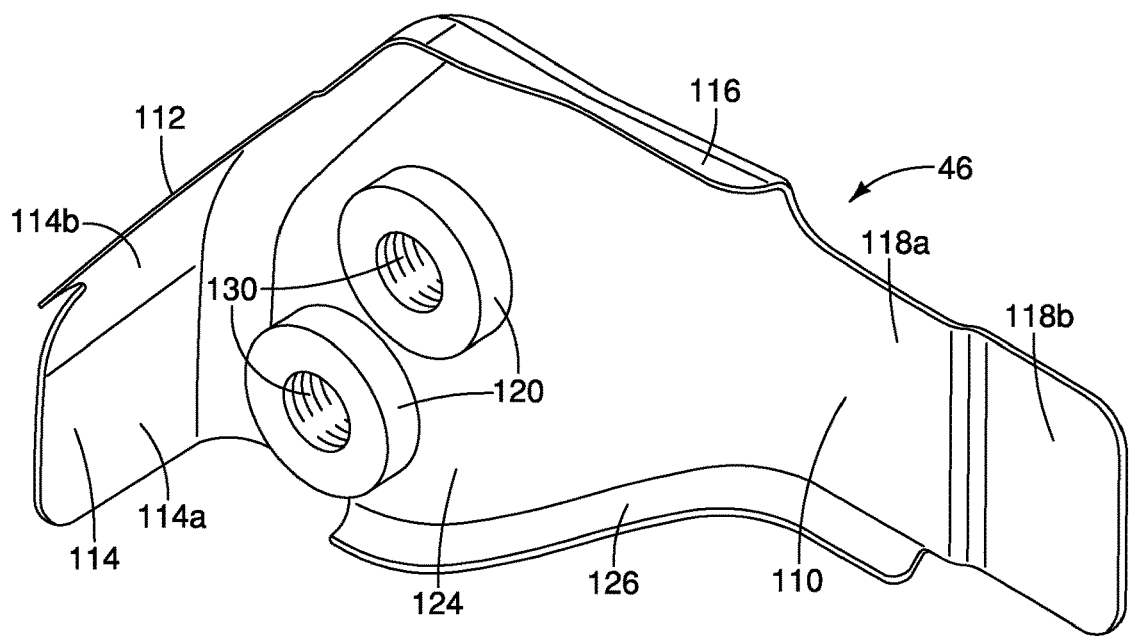
FIG. 10 is a second perspective view of the bracket removed from the vehicle cargo structure showing an outboard facing surface in accordance with the exemplary embodiment.
Figure 11:
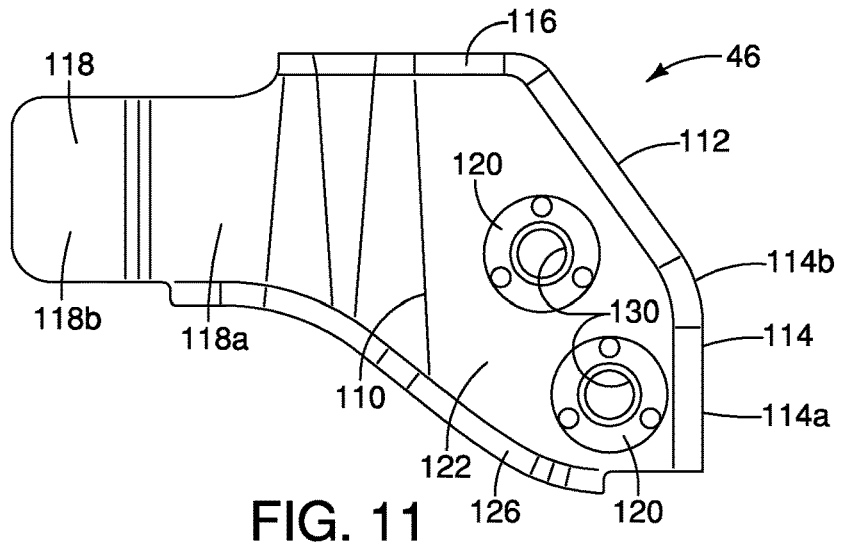
FIG. 11 is a side view of the bracket showing the inboard facing surface in accordance with the exemplary embodiment.
Figure 12:
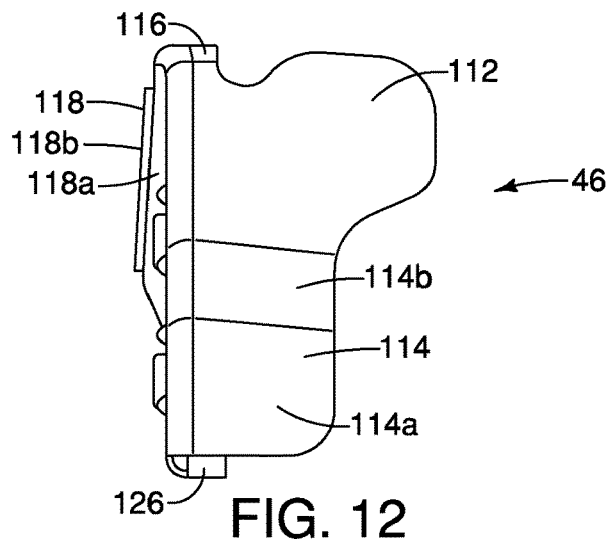
FIG. 12 is a front view of the bracket in accordance with the exemplary embodiment.

The first flange portion 112 extends from the outboard facing surface 124 and is inclined relative to vertical by an acute angle (less than 45°). The second flange portion 114 below the first portion having a vertical portion 114a and a curved portion 114b that extends to first flange portion 112. The third flange portion 116 extends along upper edge of outboard facing surface 124 in outboard direction is horizontally oriented. The fourth flange portion 118 extends in a rearward direction and has a first section 118a and a second section 118b that extends rearward from first section 118a and is parallel to first section 118a. The fastener structures 120 are welded or otherwise fixedly attached to the main section 110 and extend in an outboard direction from the outboard facing surface 124, as shown in FIG. 10. The fastener structures 120 have threaded openings 130 that extend from inboard facing surface 122 to the outboard facing surface 124.

Figure 13:
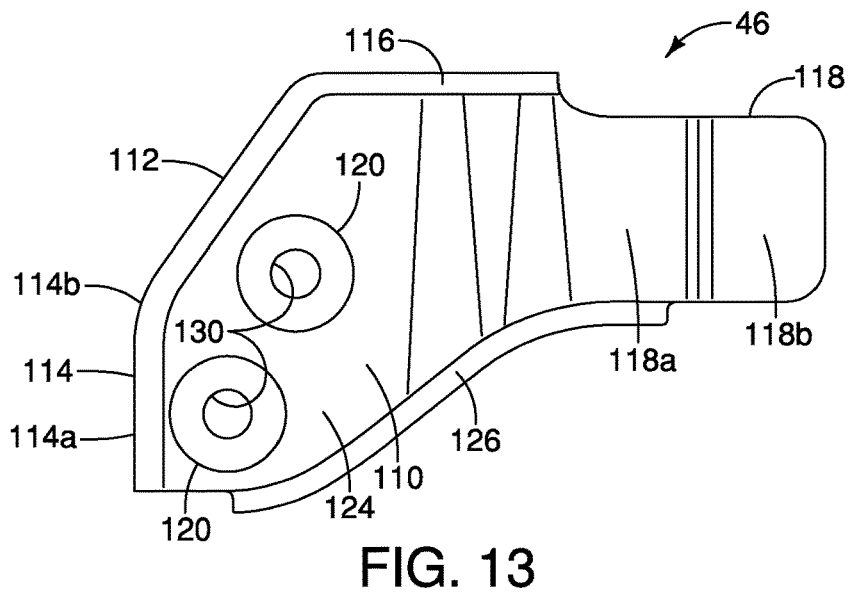
FIG. 13 is another side view of the bracket showing the outboard facing surface in accordance with the exemplary embodiment.

The bracket 46 further includes a lower flange 126 that extends from the outboard facing surface 124 along a lower end of the main section 110, as shown in FIGS. 10 and 13.

FIGS. 17-20 show portions of the vehicle cargo structure 10 in various stages of assembly. FIGS. 17-20 are provided to show the various relationships between the elements and structures of the vehicle cargo structure 10, but do not necessarily shown the actual order in which these elements and structures are assembled.

Figure 17:
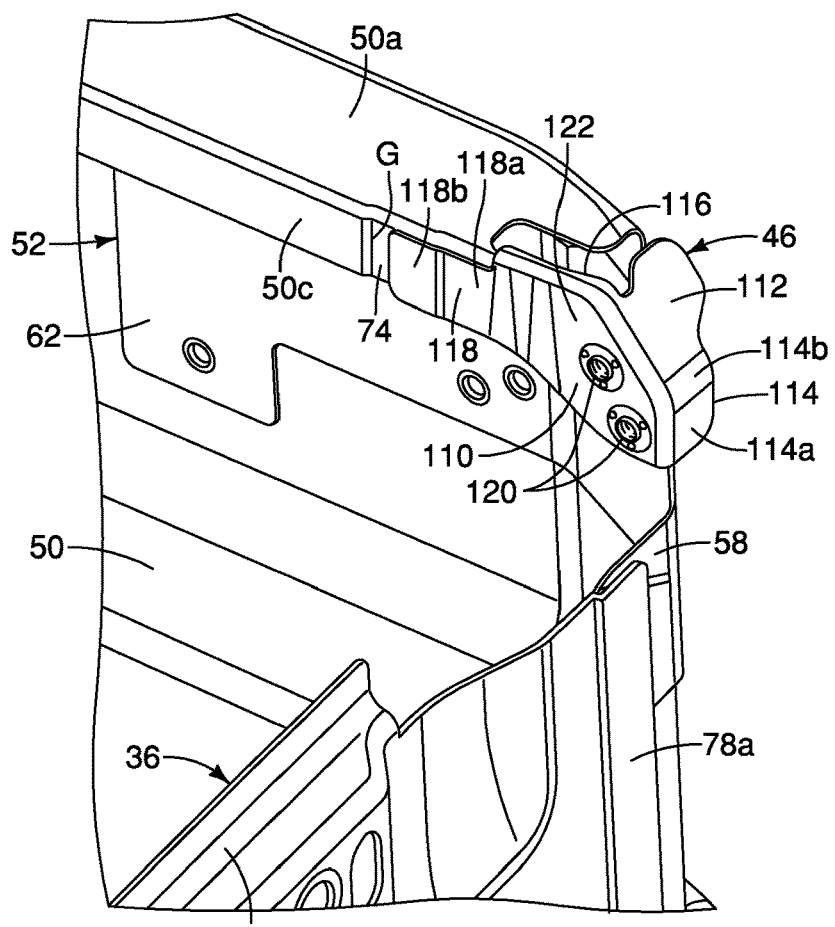
FIG. 17 is a perspective view of the vehicle cargo structure with the upright strut member and portions of the front wall structure removed showing attachment between the bracket and the reinforcement panel of the inboard side wall structure and attachment between a forward flange section of the reinforcement bracket and a wall panel of the front wall structure in accordance with the exemplary embodiment.

As shown in FIG. 17, the reinforcement panel 52 (a reinforcement bracket) is welded or otherwise fixedly attached to a front upper portion of the main panel 50 of the inboard side wall structure 40. The third section 74 of the inboard surface 64a of the inboard section 64 of the reinforcement panel 52 is visible in the gap G defined by the inboard flange 50c of the main panel 50. The upper section 60 (not visible in FIG. 17) of the reinforcement panel 52 is welded to or otherwise fixedly attached to the underside of the upper portion 50a of the main panel 50. Further, although not visible in FIG. 17, the outboard section 62 of the reinforcement panel 52 is welded to or otherwise fixedly attached to the inboard side of the upper outboard area 50b of the main panel 50. Thus, the reinforcement panel 52 is fixedly and non-movably attached to an upper forward area of the main panel 50.

As is shown in FIG. 17, an outboard flange 78a of the wall panel 78 of the front wall structure 36 overlaps but is slightly spaced apart from the attachment flange 58 of the main panel 50 of the inboard side wall structure 40. As shown, the upper end of the flange 78a and the upper end of the attachment flange 58 are both below and spaced apart from the bracket 46.

Figure 18:
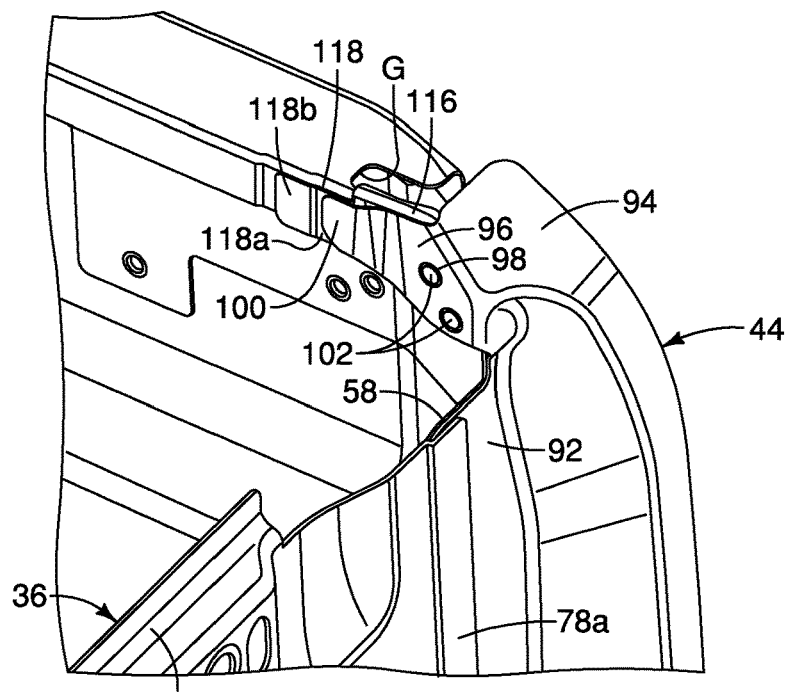
FIG. 18 is another perspective view of the vehicle cargo structure similar to FIG. 17 with portions of the front wall structure removed showing attachment between the bracket and the upright strut member and attachment between the forward flange section of the reinforcement bracket, the wall panel of the front wall structure and a main section of the upright strut member in accordance with the exemplary embodiment.

As shown in FIG. 18, the main section 92 of the upright strut member 44 extends in an inboard direction to an area between the outboard flange 78a and the attachment flange 58. The main section 92, the outboard flange 78a and the attachment flange 58 are welded or otherwise rigidly fixed to one another. Like the outboard flange 78a and the attachment flange 58, the main section 92 of the upright strut member 44 is spaced apart from the bracket 46.

As shown in FIG. 17, the bracket 46 is installed to a forward upper end of inboard side wall structure 40. Specifically, the first section 118a of the fourth flange portion 118 of the bracket 46 overlays and is welded to the first section 70 of the inboard surface 64a of the inboard section 64 of the reinforcement panel 52. The second section 118b of the fourth flange portion 118 of the bracket 46 overlays and is welded to the second section 72 of the inboard surface 64a of the inboard section 64 of the reinforcement panel 52. As shown in FIG. 17, the third section 74 of the inboard surface 64a of the inboard section 64 of the reinforcement panel 52 is exposed at a point adjacent to and rearward of the second section 118b of the bracket 46.

Hence, the bracket 46 is attached to a forward upper portion of the reinforcement panel 52 of the inboard side wall structure 40. The reinforcement panel 52 is welded to or otherwise non-movably fixed to the main panel 50 of the inboard side wall structure 40. Therefore, the bracket 46 is directly fixed to the reinforcement panel 52 and in-directly fixed to the main panel 50.

However, the bracket 46 is spaced apart from and positioned above the attachment between the main section 92, the outboard flange 78a and the attachment flange 58.

As shown in FIG. 18, when the upright strut member 44 is installed, the main section 92, the outboard flange 78a and the attachment flange 58 are welded or otherwise rigidly fixed to one another, as mentioned above. Further, the curved upper end section 94 of the upright strut member 44 covers the first flange portion 112 and the second flange portion 114 of the bracket 46. Specifically, the first flange portion 112 and the vertical portion 114a and the curved portion 114b of the second flange portion 114 are covered and concealed by the curved upper end section 94 of the upright strut member 44. As well, the attachment section 98 and the bracket attachment section 100 cover and conceal the first section 118a and most of the inboard facing surface 122 of the fourth flange portion 118 of the bracket 46. As shown in FIG. 18, the second portion 118b of the fourth flange portion 118 of the bracket 46 are not covered or concealed by the upright strut member 44. As is clear by comparing FIGS. 17 and 18, the openings 102 in the attachment section 98 align with the threaded openings 130 of the fastener structures 120 of the bracket 46.

Figure 19:
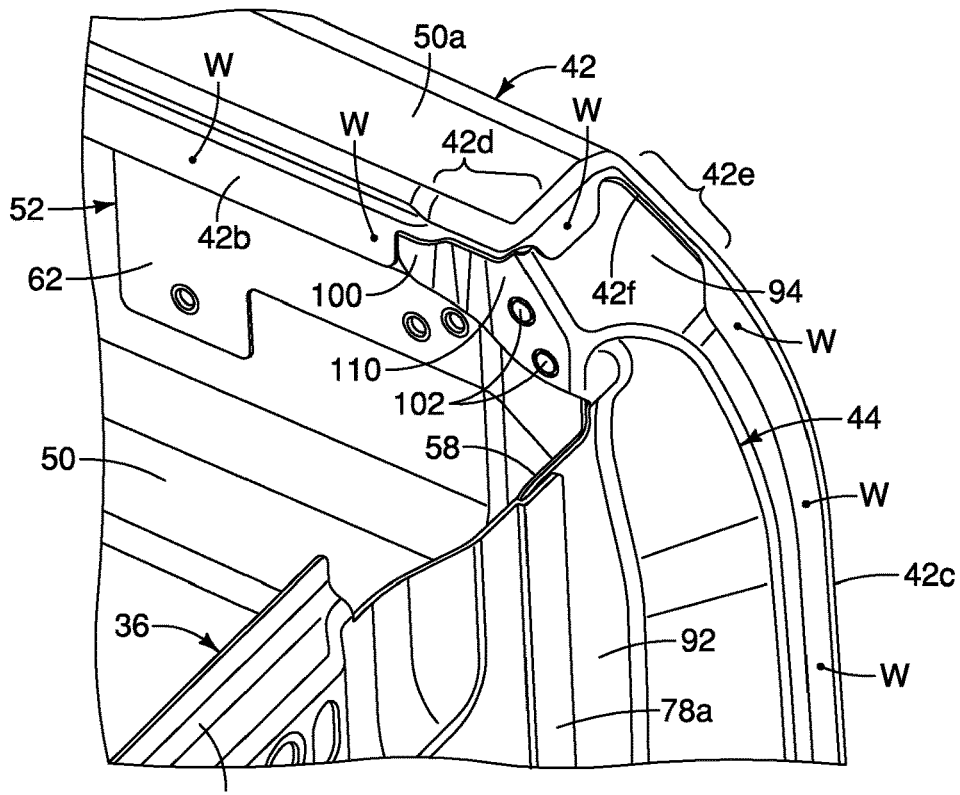
FIG. 19 is another perspective view of the vehicle cargo structure similar to FIGS. 17 and 18 with portions of the front wall structure removed showing attachment between the outer side wall member and the upright strut member and attachment between the upright strut member, the wall panel of the front wall structure and the forward flange section of the reinforcement bracket in accordance with the exemplary embodiment.

As shown in FIG. 19, when the outboard side wall member 42 is installed, the main section 42c covers and conceals outboard and upper portions of the inboard wall structure 40. Specifically, the upper portion 42a of the outboard side wall member 42 covers and conceals the upper portion 50a of the inboard side wall structure 40 and the upper section 60 of the reinforcement panel 52. Further, the inboard flange 42b of the outboard side wall member 42 covers and conceals the inboard flange 50c of the main panel 50. Further, the main section 42c of the outboard side wall member 42 wraps around an outboard portion of the main section 92 of the upright strut member 44, as shown in FIGS. 19 and 20.

Further, an upper portion of the main section 42c of the outboard side wall member 42 wraps around an outboard portion of the curved upper end section 94 of the upright strut member 44. However, as shown in FIG. 19, a majority of the curved upper end section 94 is exposed. The main section 42c of the outboard side wall member 42 is welded to the forward edge of the curved upper end section 94 and the main section 92 of the upright strut member 44 at the depicted weld locations W. As shown in FIG. 19 there are two no attachment zones 42d and 42e where there are no welds. The absence of welds in these zones allow for flexing of the vehicle cargo structure 10. Further an edge section 42f corresponds to the no attachment zone 42e and is provided to ensure some flexing at that location of front wall structure 36 and the outboard side wall member 42 relative to one another.

Hence, the forward end of the outboard side wall member 42 is fixed to the upright strut member 44 by the welds W. However, due to the shape of the area of the outboard side wall member 42 forward of the upper portion 42a, the driver's side wall 32 can undergo some lateral flexing. This flexing is also made possible due to the inboard side wall structure 40 being attached to the upright strut member 44 by the attachment flange 58 being welded to the main section 92 of the upright strut member 44 at a location spaced apart from and located below the bracket 46.

As is clear by comparing FIGS. 17 and 18, the openings 102 in the attachment section 98 of the upright strut member 44 align with the threaded openings 130 of the bracket 46.

FIG. 20 shows the upper support rail 80 (a top rail panel) of the front wall structure 36 attached to the wall panel 78. Specifically, the upper support rail 80 is welded or otherwise fixedly and rigidly attached to the upper end of the wall panel 78. The attachment panel 82 (a front wall bracket) is welded to the upper support rail 80. With the upper support rail 80 and the attachment panel 82 in position as shown in FIG. 20, the openings 90 of the flange portion 88 of the attachment panel 82 align with the openings 102 of the attachment section 98 of the upright strut member 44 and align with the threaded openings 130 of the fastener structures 120 of the bracket 46. The fasteners $F_1$ are inserted into the openings 90, through the openings 102 of the upright strut member 44 and threaded into the openings 130 of the fastener structures 120 of the bracket 46. With the fasteners $F_1$ tightened and torqued to a predetermined level of torque, the front wall structure 36, the upright strut member 44 and the forward end of the driver's side wall 32 are rigidly attached to each other. Hence, the bracket attachment section 98 of the upright strut member 44 is confined between the flange portion 88 of the attachment panel 82 of the front wall structure 36 and the main section 110 of the bracket 46 via the tightened fasteners $F_1$.

The following relationships make it possible for the front wall structure 36 and the driver's side wall 32 to flex in response to changes in cargo loads and rough road conditions while carrying a heavy cargo load. The upper end of the front wall structure 36 and the upper end of the upright strut member 44 are fixed to one another via the connection between the fasteners $F_1$ and the bracket 46. All other connections between the front wall structure 36 and the upright strut member 44 are spaced apart from and below the bracket 46. The bracket 46 is fixed to an upper forward area of the inboard side wall structure 40.

The various elements of the vehicle 12 other than the above described features of the vehicle cargo structure 10 are conventional components that are well known in the art. Since these vehicle elements are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle cargo area. Accordingly, these terms, as utilized to describe the present invention should be interpreted relative to a vehicle equipped with the vehicle cargo area.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle cargo structure, comprising:
   an inboard side wall structure;
   an upright strut member;
   a front wall structure; and
   a bracket attached to a forward upper portion of the inboard side wall panel, an upper end of the upright member and an outboard end of the front wall structure, the bracket including an inboard facing surface having a flange portion extending in a vehicle rearward direction having a first section and a second section extending from first section that is offset and parallel to first section, and the inboard side wall structure includes a downwardly extending flange portion having first and second surface portions offset and parallel to one another that overlay the first and second sections of the inboard facing surface of the bracket.

2. The vehicle cargo structure according to claim 1, wherein
   the inboard side wall structure includes a main panel and a reinforcement panel fixedly attached to one another, the downwardly extending flange portion being part of the reinforcement panel with the first and second surface portions of the downwardly extending flange portion being welded to the first and second surface portions of the inboard facing surface of the bracket.

3. A vehicle cargo structure, comprising:
   an inboard side wall structure;
   an upright strut member;
   a front wall structure; and
   a bracket attached to a forward upper portion of the inboard side wall panel, an upper end of the upright member and an outboard end of the front wall structure, wherein the bracket includes a first flange portion with a surface portion that is inclined relative to vertical relative to a vehicle forward direction, and the upright strut member includes a surface portion that is also inclined relative to vertical overlaying the surface portion of the first flange portion of the bracket.

4. The vehicle cargo structure according to claim 3, wherein
   the bracket includes an upright main portion that defines threaded fastener openings,
   the upright strut member includes a rearwardly extending flange that overlays the upright main portion, the upright strut member having openings that align with the threaded fastener openings of the upright main portion of the bracket, and
   the front wall structure includes an upright flange portion having fastener receiving openings that align with the threaded fastener openings in the upright main portion of the bracket, with mechanical fasteners extending through the fastener receiving openings, through the openings in the upright strut member and further into the threaded fastener openings of the bracket thereby securing the front wall structure, the upright strut member and the bracket to one another.

5. The vehicle cargo structure according to claim 1, further comprising
   an outboard side wall member fixedly attached to an upper portion of the inboard side wall panel.

6. The vehicle cargo structure according to claim 5, wherein the bracket is secured to the upper end of the front wall structure and the upright strut member via mechanical fasteners.

7. The vehicle cargo structure according to claim 6, wherein
the front wall structure includes a top rail and an attachment bracket fixedly attached to the top rail, the attachment bracket having corresponding fastener receiving openings that receive the mechanical fasteners.

8. The vehicle cargo structure according to claim 1, wherein
the first and second surface portion of the downwardly extending flange portion of the inboard side wall structure that overlay the first and second sections of the inboard facing surface of the bracket and are welded thereto.

9. The vehicle cargo structure according to claim 8, wherein
the inboard side wall structure includes a main panel and a reinforcement panel fixedly attached to one another, the downwardly extending flange portion being part of the reinforcement panel.

10. The vehicle cargo structure according to claim 1, wherein
the inboard side wall structure overlays and is fixedly attached to the inboard facing surface of the bracket, and, a rearward facing surface of the upright strut member is fixedly attached to a first flange portion of the bracket.

11. The vehicle cargo structure according to claim 10, wherein
the first flange portion extends in an outboard direction from the inboard facing surface and is inclined relative to vertical by an acute angle, and
the rearward facing surface of the upright strut member is inclined relative to vertical by the acute angle overlaying the first flange portion of the bracket.

12. A vehicle cargo structure, comprising:
a reinforcement panel;
an upright strut member having an upper end;
a front wall structure having an attachment bracket fixed to an outboard upper end of the front wall structure; and
a bracket fixedly attached to a forward portion of the reinforcement panel and the upper end of the upright strut member, the bracket being further secured to the attachment bracket of the front wall structure via mechanical fasteners.

13. The vehicle cargo structure according to claim 12, wherein
the reinforcement panel is fixedly attached to a forward portion of a main panel of an inboard side wall structure.

14. The vehicle cargo structure according to claim 13, further comprising
an outboard side wall member that has a lower portion welded to a corresponding lower portion of the upright strut member.

15. The vehicle cargo structure according to claim 14, wherein
the outboard side wall member that has an upper portion welded to a corresponding upper portion of the inboard side wall structure.

16. The vehicle cargo structure according to claim 12, wherein
the front wall structure includes a wall panel, an upper support rail and the attachment bracket with the wall panel and the upper support rail being welded to one another, and the attachment bracket being welded to an outboard end of the upper support rail.

17. The vehicle cargo structure according to claim 14, wherein
the attachment bracket having an upright flange having openings that receive the mechanical fasteners.

18. The vehicle cargo structure according to claim 12, wherein
the inboard side wall structure is not attached to the upright strut member below the bracket.

19. The vehicle cargo structure according to claim 12, wherein
the front wall structure is attached to the upright strut member below the bracket.

* * * * *